United States Patent [19]

Jackson et al.

[11] 3,790,353

[45] Feb. 5, 1974

[54] HARD-FACING ARTICLE

[75] Inventors: Hewy E. Jackson, Livingston; Howard B. Myers, Humble, both of Tex.

[73] Assignee: The Servco Company, a division of Smith International Inc., Long Beach, Calif.

[22] Filed: Feb. 22, 1972

[21] Appl. No.: 227,777

[52] U.S. Cl................29/182.7, 29/182.3, 51/293, 51/309, 75/208, 75/203, 75/204, 29/182.8
[51] Int. Cl....... C22c 29/00, C22c 1/05, B22f 7/04, B22f 7/08
[58] Field of Search . 29/182.2, 182.3, 182.8, 182.7; 75/208, 203, 204; 51/293, 309

[56] References Cited
UNITED STATES PATENTS
2,833,638 5/1958 Owen.............................. 51/309

*Primary Examiner*—Carl D. Quarforth
*Assistant Examiner*—R. E. Schafer
*Attorney, Agent, or Firm*—Robert L. Parker et al.

[57] ABSTRACT

A hard facing wear pad usable, for example, by brazing to a digger tooth or the like is provided in practice of this invention. The wear pad is from 70 to 85 percent by volume particles of cemented metal carbide in a metal matrix having a melting point not substantially higher than the melting point of the metal cementing the carbide. The cemented carbide particles are in the size range of from about 6 to 30 U.S. Sieve, and the thickness of the pad is within limits determined by the cemented carbide particle size.

8 Claims, 5 Drawing Figures

PATENTED FEB 5 1974 3,790,353
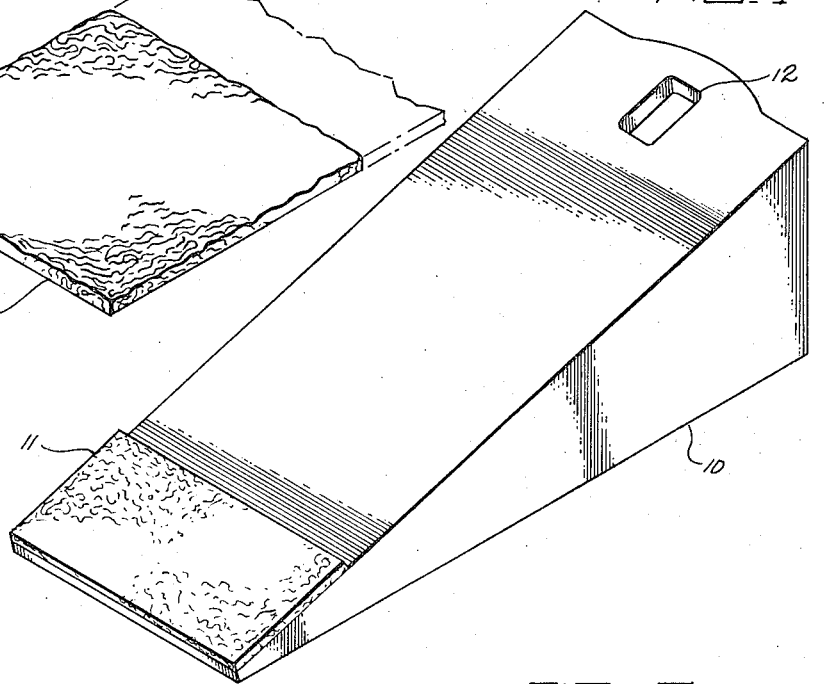
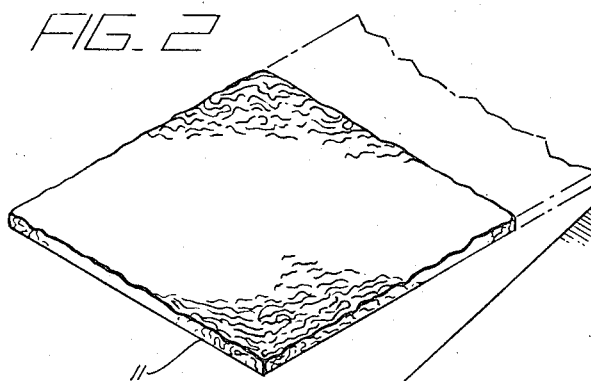
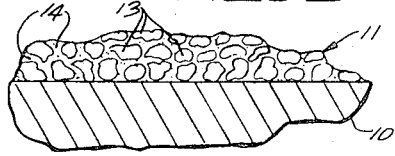
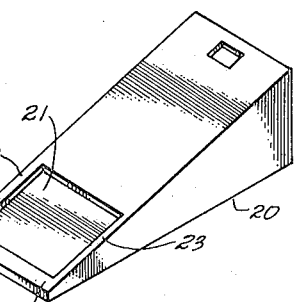
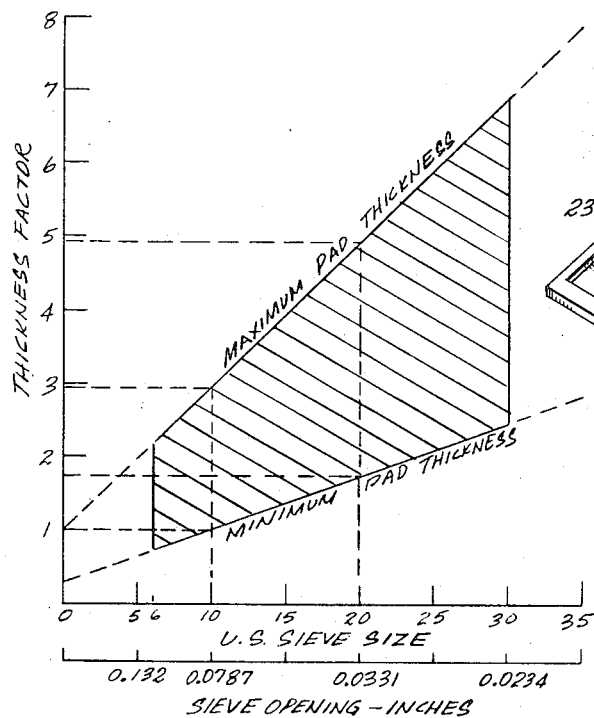

HARD-FACING ARTICLE

BACKGROUND

U.S. Pat. No. 2,833,638 provides a hard-facing material and technique for applying it to oil field tools, digger teeth, and the like. As taught in that patent, cemented metal carbide particles are bonded together in a metal matrix and bonded to the steel forming the body of the tool. Typically, the cemented carbide particles are composite structures wherein tungsten carbide grains are cemented together by cobalt, nickel or iron. In addition to tungsten carbide, other metal carbides such as molybdenum, chromium, vanadium, titanium, uranium, tantalum, and columbium, or mixtures thereof, have been available. In addition, a variety of metallic binders have been used.

Cemented or sintered carbide articles, such as cutting tools, have been used in a wide variety of applications, and surplus and scrap articles so formed are readily available. Such cemented carbide articles are crushed and screened to provide irregularly shaped pieces which are bonded together to provide a hard facing.

The cemented carbide particles are bonded together according to techniques described in aforementioned U.S. Pat. No. 2,833,638 by use of a metallic matrix having a melting point preferably lower than, and certainly not substantially higher than, the melting point of the metal cementing the carbide particles. The metal matrix used for bonding the cemented carbide particles together bonds with the cementing metal of the particles to form an extremely strong interface. A broad variety of materials are suitable for the metallic matrix as set forth in the aforementioned patent. Primarily, according to teachings of that patent, the metal matrix containing cemented metal carbide particles is melted in place on an oil field tool or the like. It is also suggested that hard-facing pads be prepared and brazed onto other articles.

It has been found that the wear properties of wear pads formed of cemented metal carbides in a metal matrix may be erratic, and in some cases fairly rapid. This was thought to rise from differences in application of the wear pad to digger teeth and the like in the field, since the individuals applying the wear pads may introduce uncontrolled variables.

It has now been discovered, however, that the wear properties can be greatly enhanced and erratic results substantially reduced by providing wear pads having cemented carbide particles in a limited size range and high volumetric proportion in cooperation with a pad thickness within limits determined by the particle size distribution of thee cemented metal carbide particles.

BRIEF SUMMARY OF THE INVENTION

Therefore, in practice of this invention according to a presently preferred embodiment, there is provided a wear pad having particles of cemented metal carbide bonded together by a metal matrix wherein the cemented carbide particles are in the size range of from about 6 to 30 U.S. Sieve, and having a sufficiently non-uniform size distribution to be present in a proportion in the range of from about 70 to 85 percent by volume in the metal matrix. The wear pad has a minimum thickness in inches of about the U.S. Sieve opening in inches of the smallest cemented carbide particles times a factor equal to $0.075M_1 + 0.3$, where $M_1$ is the U.S. Sieve size for the smallest cemented carbide particles, and a maximum thickness in inches of about the U.S. Sieve opening in inches of the largest cemented carbide particles times a factor equal to $0.20M_2 + 1.0$, wherein $M_2$ is the U.S. Sieve size for the largest cemented carbide particles.

DRAWINGS

These and other features and advantages of the present invention will be appreciated as the same becomes better understood by reference to the following detailed description of a presently preferred embodiment when considered in connection with the accompanying drawings wherein:

FIG. 1 illustrates in perspective a typical digger tooth including a wear pad constructed according to principles of this invention;

FIG. 2 illustrates a typical wear pad before application to a substrate;

FIG. 3 illustrates in fragmentary cross-section a hard facing produced in practice of this invention;

FIG. 4 is a graph for determining the thickness of wear pad based on the size of the cemented metal carbide particles therein; and FIG. 5 illustrates in perspective another embodiment of digger tooth constructed according to principles of this invention.

DESCRIPTION

FIG. 1 illustrates in perspective a typical digger tooth 10 near the tip of which a wear pad 11 is attached. Typically, such a tooth may have a hollow socket (not shown) in its base and a mounting hole 12 for connection to a scoop or the like as may be used for earthmoving operations. It will be appreciated that application to such a digger tooth is only representative of a broad variety of applications of a hard-facing pad as may be provided in practice of this invention. FIG. 2 illustrates the wear pad 11 before application to a digger tooth, and by phantom lines indicates that it may be broken off of a much longer piece of hard facing material. Thus, for example, the pad may be available with a width of 1-⅞ inches and the length of 12 inches and convenient lengths of it are readily broken off in the field for application to digger teeth or other substrates on which it may be desired to provide a hard-facing surface. FIG. 3 is a fragmentary cross-section of a hard-facing produced by attaching a pad 11 to a digger tooth 10.

As mentioned hereinabove, the wear pad 11 is formed of a large number of irregular cemented metal carbide particles 13 bonded together in a metal matrix 14. The cemented carbide particles are formed of metal carbides cemented together with metals, and include the various types set forth in U.S. Pat. No. 2,833,638. The precise metal carbides and cementing materials are not critical to practice of this invention so long as they are of the type described in the aforementioned patent. Similarly, the metal matrix supporting the cemented carbide particles is not critical so long as it has a melting point that is not substantially higher than the melting point of the metal cementing the carbide so that there is no injurious heating of the cemented carbide bodies during fabrication and installation of the wear pad. A substantial number of metal carbides, cementing metals, and metal matrixes are set forth in the aforementioned patent and are found suitable for practice of this invention.

Preferably, the cemented metal carbide is predominantly or entirely tungsten carbide bonded with cobalt in the conventional manner. This material is found to have exceptionally high abrasion resistance, and sufficient toughness to withstand a substantial amount of shock loading. The density is also high relative to the metal matrix. Preferably, the metal matrix is a so-called "nickel silver," such as one that is nominally 48 percent copper, 41 percent zinc and 10 percent nickel (RBCuZn-D). Such material has high strength and toughness for supporting the cemented metal carbide particles, thereby preventing their shattering or extraction from the matrix. Such material has excellent ability to wet steel substrates and also wet the cementing metal in the tungsten carbide particles so as to form a strong bond therebetween. Other "nickel silvers" and brazing alloys may be employed as the metal matrix.

The cemented metal carbide particles are preferably present in the wear pad in a size range of from 6 to 30 U.S. Sieve. By this it is meant that the particles will pass through a No. 6 U.S. Sieve series screen and are retained on a No. 30 U.S. Sieve series screen. The U.S. Sieve series of screens is defined in the literature; for example, the No. 6 Sieve has a screen opening of about 0.132 inch. Similarly, the No. 30 screen has a screen opening of about 0.023 inch.

If the particle size is larger than about No. 6 U.S. Sieve, the matrix metal may not provide sufficient support for the particles in high impact situations and particle shattering or extraction from the matrix may occur. If the cemented carbide particle sizes are less than about 30 mesh, the matrix metal may attack the cementing metal sufficiently that the wear properties of the pad are reduced. Within this particle size range of from about 6 to 30 U.S. Sieve, the particle size of cemented metal carbide particles in a wear pad may be of a more limited range, such as, for example, 6 to 12 mesh, 10 to 20 mesh, 10 to 30 mesh, 14 to 30 mesh, or the like.

The size range of the cemented carbide particles in the wear pad is sufficiently broad that dense packing of the particles in the metal matrix is achieved. Preferably, the particle size range is sufficiently broad that the carbide particles are present in the range of from about 70 to 85 percent by volume, with the metal matrix making up the balance. This proportion in combination with the other parameters of the wear pad gives optimum wear resistance.

If the proportion of cemented metal particles is less than about 70 percent by volume, the surrounding metal matrix is subjected to sufficient wear that the carbide particles are left relatively exposed and subject to shattering and withdrawal from the matrix. If the carbide particle proportion is greater than about 85 percent by volume, insufficient metal matrix is present to provide a strong bond to the substrate and removal of the carbide particles may occur at an unacceptably high rate. A particle size range is therefore provided sufficiently broad that relatively smaller particles are available to fill voids between relatively larger particles, thereby avoiding relatively large contiguous volumes of matrix material which are subject to wear, and which would deplete the proportion of matrix material available for supporting the entire volume of cemented metal carbide particles.

Of importance in wear pads constructed according to principles of this invention is the thickness of the pad relative to the particle sizes therein. It has been discovered that the maximum and minimum thicknesses of the pad for optimum wear resistance fall within limits defined by the U.S. Sieve sizes of the minimum and maximum size cemented carbide particles. The relationship of the thickness and particle size is illustrated in FIG. 4, which is a graph of a thickness factor on the ordinate as a function of the U.S. Sieve size on the abscissa. For convenience on the graph of FIG. 4, the approximate sieve opening in inches for the U.S. Sieve is also indicated. The minimum pad thickness is expressed by the relation $T_{min} = 0.075 M_1 + 0.3$ wherein $M_1$ is the U.S. Sieve size for the smallest cemented carbide particles in the wear pad. The maximum pad thickness is expressed by the relation $T_{max} = 0.20 M_2 + 1.0$ wherein $M_2$ is the U.S. Sieve size for the largest cemented carbide particles. The wear pad preferably has a minimum thickness determined from the thickness factor $T_{min}$ of the above formula, or from the lower minimum pad thickness curve in the graph of FIG. 4 times the approximate mesh opening of the U.S. Sieve series for the smallest particles in the pad. Similarly, the wear pad preferably has a maximum thickness of the above-mentioned factor $T_{max}$ from the above relationship or from the upper maximum pad thickness curve in FIG. 4 times the approximate mesh opening of the U.S. Sieve series size of the largest particles in the wear pad.

Thus, for example, in a wear pad having cemented carbide particles in the range of from 10 to 20 mesh, the largest U.S. Sieve opening is 0.0787 inch and the smallest U.S. Sieve opening is about 0.0331 inch. From the above relation, or from FIG. 4, it is found that the thickness factor $T_{min}$ for a No. 10 U.S. Sieve is about 1.0, and the thickness factor $T_{max}$ for the No. 10 U.S. Sieve is about 2.95. Similarly, for a No. 20 U.S. Sieve, the thickness factor $T_{min}$ is about 1.75 and the thickness factor $T_{max}$ is about 4.95. The actual permissible thickness of pad is then found by multiplying the appropriate thickness factor by the approximate U.S. Sieve mesh opening.

Thus, if 10 mesh particles were all that were present in the wear pad, the minimum thickness would be 1.0 times 0.0787, or 0.0787 inches. Similarly, the maximum thickness would be 2.95 times 0.087, or 0.232 inches. If the particles in the wear pad were all 20 mesh, the minimum thickness would be 1.75 times 0.0331, or 0.0579 inch. Similarly, the maximum thickness dictated by 20 mesh particles would be 4.95 times 0.0331, or 0.164 inch. Based on this it is seen that for a wear pad having cemented metal carbide particles in the size range of from 10 to 20 mesh U.S. Sieve series, the minimum thickness is about 0.0579 inch, and the maximum thickness is about 0.232 inch.

Wear pads that are made in a thickness less than the minimum ascertained as set forth above are generally too thin for any reasonable wear life. This is believed to be due to a poor cemented carbide particle distribution and non-uniform concentration throughout the matrix, thereby leading to relatively rapid wear. It has also been found that when wear pads are made in thicknesses greater than that ascertained as set forth hereinabove, there is a substantial tendency for the pad to smear, resulting in an excessively high initial wear rate. Although the overall life of the pad may be about as high as for thinner pads, there is no benefit from the greater thickness, and the increased cost is not justified. Between these maximum and minimum thicknesses, any convenient thickness may be employed. Thus, the thickness of the wear pad provided in practice of this invention is equal to the U.S. Sieve opening in inches times a thickness factor corresponding to that portion of the shaded area of FIG. 4 bounded by the minimum U.S. Sieve size and the maximum U.S. Sieve size of the cemented carbide particles in the pad.

It will be recognized, of course, that wear pads produced in practice of this invention have an extremely rough surface due to protrusion of portions of the cemented carbide particles, and that although the numerical values for minimum and maximum thickness have been stated with apparent great precision hereinabove, they should be recognized as only approximate and represent somewhat of an average thickness.

A wear pad as hereinabove described is prepared by processes as set forth in the aforementioned U.S. Pat. No. 2,833,638 wherein the metal matrix is melted with the cemented carbide particles and a suitable flux for a sufficient time to obtain good bonding. The matrix metal, cemented carbide particles and brazing flux are placed in a shallow carbon mold and heated in a furnace at about 1,800° F. The metal matrix with carbide particles dispersed therein is thereby formed into pads which may, for example, be about two inches by 12 inches, and the thickness determined is set forth hereinabove. These pads are allowed to freeze in a horizontal position, and the molten matrix tends to form a relatively smooth lower surface and a relatively rougher upper surface on the pad. When the preferred tungsten carbide is employed, the very high density of the carbide particles tends to increase the proportion thereof near the lower surface of the pad as it is cast.

It has also been found desirable to add a thin layer of strengthening metal powder in the carbon mold before the cemented carbide particles and metal matrix material are added. Typically this comprises about 4 percent by weight of a mixture of powders comprising about 100 parts nickel powder, 3 parts chromium powder, and 4 parts cobalt powder. When the "nickel silver" matrix metal melts, it apparently alloys with this powder and produces a relatively harder, tougher, wear-resistant surface in the metal matrix. The composition of the resultant matrix adjacent the surface is uncertain and there is a composition gradient through the matrix. This combined with the relatively high proportion of dense tungsten carbide adjacent the bottom face of the wear pad as it is formed in the mold substantially enhances the wear resistance of the pad when applied as hereinafter described. Preferably, the metal powders added to the mold have a particle size less than about 80 U.S. Sieve. This particle size is sufficiently smaller than the cemented metal carbide particles that it does not interfere with relatively dense packing thereof, and at the same time, it enhances the wear resistance of the metal matrix in which the cemented carbide particles are dispersed.

As pointed out hereinafter, this lower "as-cast" surface of the wear pad becomes the outer or initial wear surface when it is applied to a digger tooth or the like. When so applied, a tough, somewhat ductile metal matrix supports the lower portions of the cemented metal carbide particles. Nearer the outer surface of the wear pad, the metal matrix is further reinforced by the added metal alloyed therein.

In order to apply the wear pad to a substrate, such as, for example, a digger tooth, a suitable length of the pad is broken off and placed at a convenient location near the site where it is to be applied, preferably on the part to which it is to be applied so as to be preheated therewith. Typically, an oxygen-acetylene torch is used to preheat the entire area to be hard-faced along with the surrounding structure so that rapid cooling does not occur. A neutral flame is played back and forth over the entire working area, and whatever adjacent structure may need to be preheated. By placing the wear pad on the structure to which it is to be bonded, preheating of the wear pad occurs without substantial danger of damage due to overheating.

When the substrate is preheated to a dull cherry red, a conventional brazing flux is added to remove any oxides that may be present on the surface of the substrate. A conventional "nickel silver" brazing rod is then used to "tin" the surface to which the wear pad is to be bonded. The entire surface is pretinned in a conventional manner, and typically the total thickness of braze alloy that accumulates on the surface will be one thirty-second to one-sixteenth inch thick.

The wear pad is also coated with a conventional brazing flux and is put into position on the area to which it is to be bonded with the relatively rougher upper as-cast surface adjacent the substrate, and the relatively smoother, lower as-cast surface exposed. That is, the surface that was adjacent the mold during forming of the pad is the exposed wear-resistant surface. By inverting the wear pad before applying it to the substrate, the more dense proportion of cemented tungsten carbide particles near the lower as-cast surface is adjacent the wear surface, thereby enhancing the wear-resisting qualities of the pad. The strengthened surface produced by alloying the matrix with the added metal powder is also at this exposed surface, enhancing the wear-resistance of the matrix.

It is convenient in applying the wear pad to the substrate to merely stick the braze rod used for tinning to the surface of the pad. This serves as a convenient handle for putting it into position. Preferably, the pad is held so that there is an angle of about 30° between the pad and the substrate to which it is to be adhered during the preliminary steps of bonding it in place. The neutral flame of the torch is directed between the pad and the substrate, continually moving it until the tinning material on the substrate is beginning to melt, and the wear pad has become somewhat soft. The wear pad is then quickly placed into its final position and the tinning rod is melted loose. Then starting at one edge and slowly working across the pad to the other edge, the wear pad is brought to a molten state. If the wear pad appears to become dry from lack of matrix metal, additional "nickel silver" may be added from the tinning rod. After the entire wear pad has been bonded in place, it is insulated with lime, sand, asbestos, or the like, so as to slowly cool. The digger tooth or other article so wear-coated can then be used in a conventional manner, and it is found that significantly greater and more uniform wear resistance is obtained than has been consistently found in the prior art.

FIG. 5 illustrates in perspective a portion of another embodiment of digger tooth constructed according to principles of this invention. As provided in this embodiment, the wear resistant pad is cast in place directly on the digger tooth rather than being separately formed and subsequently brazed in place. Thus, as illustrated in FIG. 5, there is a forged or cast steel or white iron digger tooth 20 having a shallow pocket 21 on one face thereof in an area in which it is desired to provide a hard, wear resistant surface. Typically this pocket is near the relatively pointed end of the digger tooth and a lip 22 about one-fourth inch wide is provided between the shallow pocket and the end of the tooth. Lips 23 about one-eighth inch wide are between the edges of the pocket and the sides of the digger tooth.

In order to form the hard, wear resistant pad on the digger tooth, a mixture of cemented carbide particles and metal matrix, preferably in the form of powder or small pieces, is placed in the pocket in a total quantity sufficient to form a wear resistant pad having a thickness in the range hereinabove defined based on the U.S. Sieve size of the cemented carbide particles. If desired, the bottom of the pocket can be pretinned with the matrix metal or related metal to assure good bonding and usually it is desirable to provide a conventional brazing flux to assure good bonding.

After the mixture of metal matrix and cemented carbide particles have been placed in the depression, about 4 percent by weight of strengthening metal powder as hereinabove set forth, is sprinkled over the top of the mixture of matrix metal and cemented carbide particles. A part of or the entire digger tooth is then heated to a sufficiently high temperature to melt the metal matrix and bond the entire wear resistant pad to the digger tooth.

The depressed pocket 21 has a depth approximately corresponding to the thickness of the desired wear resistant pad as defined by the relation set forth hereinabove. The narrow lips 22 and 23 around the periphery of the depression form the sides of a shallow mold to keep the molten brazing material from flowing away when the digger tooth is heated to the brazing temperature. By using a shallow recessed region on the digger tooth to contain the molten matrix, any need for a separate mold or the like is obviated. The manufacture of the teeth is thus much easier and cheaper than has been the case in the past since application of the wear pad is facilitated.

After the wear resistant pad is melted in place the digger tooth is used in the same manner as the one hereinabove described. The strengthening metal powder scattered on the surface of the wear pad substantially enhances the wear resistance of the metal matrix in which the cemented carbide particles are dispersed.

Although limited examples of wear pads produced according to practice of this invention have been described in detail hereinabove, many modifications and variations will be apparent to one skilled in the art. It is, therefore, to be understood that within the scope of the appended claims the invention may be practiced otherwise than as specifically described.

What is claimed is:

1. A wear pad for bonding over an extensive area of a less wear-resistant substrate comprising:
    a plurality of particles of cemented metal carbide bonded together and dispersed throughout a metal matrix, said metal matrix having a melting point not substantially higher than the melting point of metal cementing the carbide;
    said cemented carbide particles being in the size range of from about 6 to 30 U.S. Sieve and having a sufficiently non-uniform size distribution to be present in a proportion in the range of from about 70 to 85 percent by volume;
    said wear pad having a minimum thickness in inches of about the U.S. Sieve opening in inches of the smallest cemented carbide particles times a factor equal to $0.075M_1 + 0.3$, wherein $M_1$ is the U.S. Sieve size for the smallest carbide particles, and a maximum thickness in inches of about the U.S. Sieve opening in inches of the largest cemented carbide particles times a factor equal to $0.20M_2 + 1.0$ where $M_2$ is the U.S. Sieve size for the largest cemented carbide particles.

2. A wear pad as defined in claim 1 wherein the cemented metal carbide particles have a density substantially greater than the density of the metal matrix and wherein the metal matrix has a previously molten structure frozen with the greatest extent of the pad in a horizontal plane.

3. A wear pad as defined in claim 1 wherein the cemented metal carbide is predominantly tungsten carbide and the metal matrix is predominantly "nickel silver."

4. A wear pad as defined in claim 3 wherein the "nickel silver" is nominally about 48 percent copper, 41 percent zinc and 10 percent nickel.

5. A wear pad for attachment to a less wear-resistant substrate comprising:
    a plurality of particles of cemented metal carbide bonded together by and dispersed throughout a metal matrix;
    said cemented carbide particles being in the size range of from about 6 to 30 U.S. Sieve and having a sufficiently non-uniform size distribution to be present in a proportion in the range of from about 70 to 85 percent by volume;
    said wear pad having a thickness equal to the U. S. Sieve opening in inches in the range of from the minimum U. S. Sieve size to the maximum U. S. Sieve size of the cemented carbide particles in the wear pad, times a factor on the ordinate corresponding to that portion of the shaded area of FIG. 4 in the range bounded on the abscissa by the minimum U. S. Sieve size of the cemented carbide particles in the wear pad.

6. A wear pad as defined in claim 5 wherein the cemented metal carbide particles have a density substantially greater than the density of the metal matrix and wherein the metal matrix has a cast structure frozen with the greatest extent of the pad in a horizontal plane.

7. A wear pad as defined in claim 5 wherein the cemented metal carbide is predominantly tungsten carbide and the metal matrix is predominantly "nickel silver."

8. A wear pad as defined in claim 7 wherein the "nickel silver" is nominally 48 percent copper, 41 percent zinc and 10 percent nickel.

* * * * *